Figure 1:
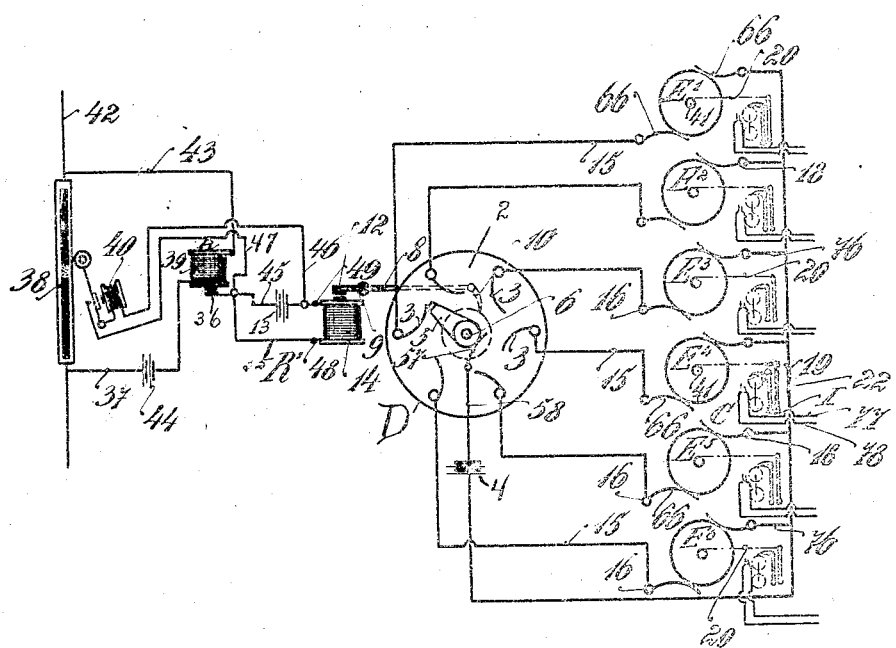

C. WIRTH & C. BECK.
RECEIVING ELECTRIC SYSTEM.
APPLICATION FILED MAR. 18, 1909.

930,588.

Patented Aug. 10, 1909.
2 SHEETS—SHEET 1.

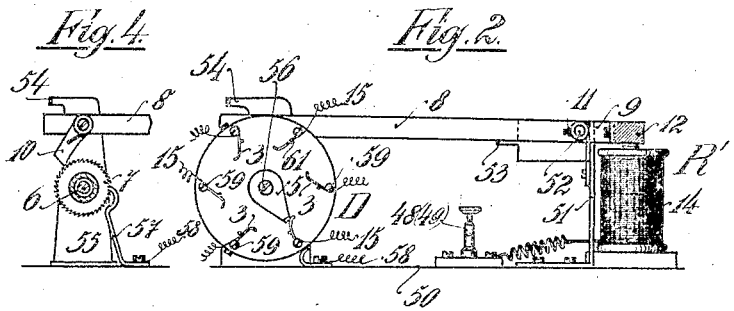
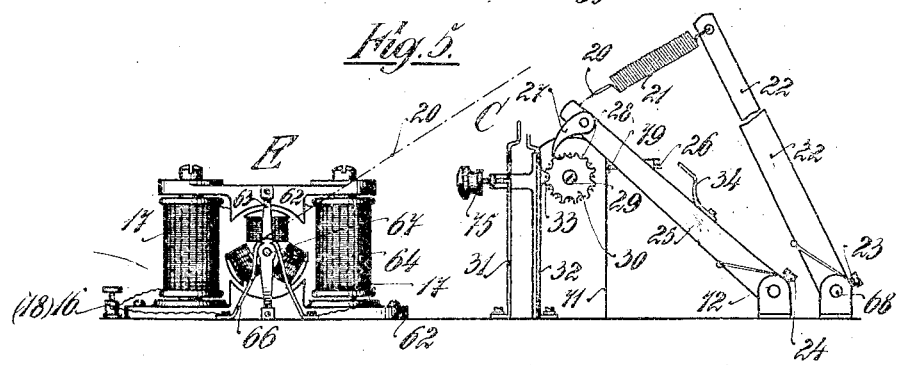
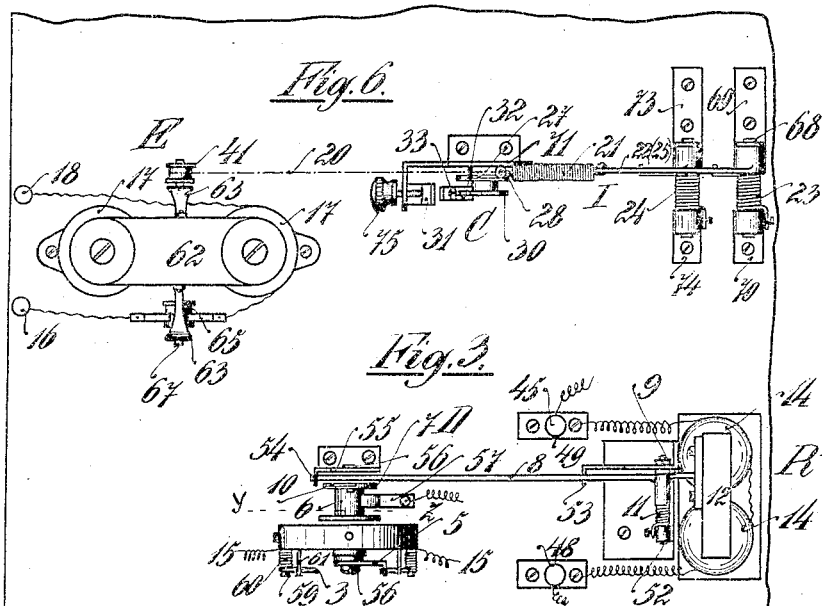

UNITED STATES PATENT OFFICE.

CHRISTOPH WIRTH AND CHRISTOF BECK, OF NUREMBERG, GERMANY.

RECEIVING ELECTRIC SYSTEM.

No. 930,538.

Specification of Letters Patent.

Patented Aug. 10, 1909.

Application filed March 18, 1909. Serial No. 484,167.

*To all whom it may concern:*

Be it known that we, CHRISTOPH WIRTH and CHRISTOF BECK, both citizens of the Empire of Germany, and residing at Nuremberg, in the Empire of Germany, have invented a new and useful Receiving Electric System, of which the following is a specification.

Our invention relates to a receiving electric system which is adapted to be controlled over distance and comprises a receiving circuit, a distributer, a primary circuit controlled by the receiving circuit for operating the distributer, a series of electromotors, a series of secondary circuits controlled by the distributer and including the electromotors, a series of cut-outs adapted to control various electric operating circuits, and a series of intermediate gears connected with the electromotors and adapted to open and to close the cut-outs. The electric operating circuits may include various known devices, machines, apparatus, or the like which can be set to work and be stopped by the cut-outs. The receiving electric system may be disposed at some place and may be controlled over distance by means of a single conductor line or by means of electrical waves. The receiving electric system may also be disposed on board a ship, or on an aerostatic vessel or machine, or in a torpedo, or on any other unmanned vessel or vehicle, and can be controlled over distance by means of electrical waves. In any case it is rendered possible to select any of the devices, machines, apparatus, or the like under the control of the receiving electric system and to set it to work and to stop it as may be required. Of course the devices, machines, apparatus, or the like may be disposed in groups, which are controlled from the cut-outs, so that if any group is selected, the several devices, machines, apparatus, or the like comprised in this group can be simultaneously set to work and stopped.

The chief feature of our invention consists in that the intermediate gears are so arranged, that they are enabled to actuate the corresponding cut-outs only if the respective electromotors are permitted to run for a sufficiently long time, while no effects upon the operating circuits are produced, if the electromotors run for too short a time.

We will now proceed to describe our invention with reference to the accompanying drawings, which illustrate a receiving electric system adapted to be controlled over distance by means of electrical waves.

Figure 1 is a diagram of the receiving electric system, Fig. 2 is an elevation of a distributer on the left and a relay on the right included in the receiving circuit and adapted to operate the distributer, the binding posts of the relay being put on the other side for the sake of clearness, Fig. 3 is a plan view of the same, Fig. 4 is a vertical section through the line $y-z$ in Fig. 3, Fig. 5 is an elevation of an electromotor on the left inserted in a secondary circuit controlled by the distributer, of an intermediate gear on the right connected with the electromotor, and of a cut-out in the middle adapted to be actuated by the intermediate gear, and Fig. 6 is a plan view of the same.

Similar characters of reference refer to similar parts throughout the several views.

The receiving electric system illustrated at Fig. 1 comprises an aerial conductor 42 or its equivalent, a coherer 38, a receiving circuit 43, 37 with a source of current 44 and a relay R (consisting of electromagnet 39 and armature 36), a primary circuit 35, 45 operated by the relay R and including a source of current 13 and a relay R', a distributer D operated by the relay R', a series of electromotors E', E$^2$, E$^3$, E$^4$, E$^5$, E$^6$, secondary circuits 15, 76, 19, 58 connecting the several electromotors E', E$^2$, ... with the distributer D and a source of current 4, a series of intermediate gears I, and a series of cut-outs C controlled thereby and inserted in operating circuits 77, 78. The tapping device 40 for the coherer 38 is shunted to the source of current 13 by lines 46 and 47.

The relay R' (Figs. 2 and 3) is shown as consisting of a pair of electromagnets 14 disposed on some base plate of insulating material, of which only the top surface is indicated by a line 50 in Fig. 2. Close by the electromagnets 14 is an angular bracket 51 of any known construction, in which a shaft 52 is fastened. A two-armed lever 8, 9 is mounted on this shaft 52 to rock and is connected with a helical spring 11 surrounding the shaft 52, which spring 11 tends to press the longer arm 8 downward. This downward motion is normally checked by a stop 53 forming a part of the bracket 51. The short arm 9 is rigidly connected with an armature 12 common to the two electromagnets 14, 14. The two binding posts 48, 49, with which the coil of the electromagnets 14, 14 is connected, are indicated by the same characters of reference in Fig. 1. The upward turn of the long arm 8 under the action of the electromagnets 14 is limited by a suitable stop 54 provided on the frame part 55 (Fig. 4) of the distributer D. The free end of the arm 8 carries a spring-pressed pawl 10.

The distributer D (see Figs. 2 and 3) comprises the just mentioned frame part 55 and a stationary disk 2, in both of which a shaft 56 is mounted to turn. This shaft 56 has fastened on it a crank 5 and a ratchet wheel 7, in which latter the spring-pressed pawl 10 engages. A contact spring 57 (Fig. 4) is made to bear against the nave 6 of the ratchet wheel 7 and is electrically connected by a line 58 with one pole of the source of current 4 mentioned above (Fig. 1). The stationary disk 2 is shown as provided with six studs 59, 59 for carrying six contact springs 3, 3, which in Fig. 3 are shown as forming the free ends of helical springs 60, 60 surrounding the studs 59 and normally bearing against stops 61, 61. The contact springs 3, 3 are electrically connected with the lines 15, 15 shown at Fig. 1 and are in any known manner insulated from the shaft 56 and from one another. The crank 5 is adapted on being rotated to strike the several contact springs 3, 3 one after the other for closing the respective secondary circuit 15, 76, 19, 4, 58.

The six electromotors $E'$, $E^2$, $E^3$, ... in Fig. 1 may be of any known construction. In Figs. 5 and 6 each of them is shown to be a series motor consisting of a pair of electromagnets 17, 17, two common polar pieces 62, 62, bearing arms 63, 63, an armature 64 and a commutator 65 with two contact brushes 66, 66. The armature shaft 67 has fastened on its outer end a pulley 41, on which one end of a rope 20 or the like is secured for connecting the electromotor E with an intermediate gear I, which is constructed as follows. A lever 22 is mounted to rock on a pin 68 fastened in two suitable supports 69 and 70 and its free end is connected with the other end of the rope 20 or the like, a helical spring 21 being preferably inserted between them. A helical spring 23 surrounding the pin 68 and having its one end fastened on the support 70 tends to press with its other end the lever 22 upward and thus to return the armature shaft 67 into its initial position. Between the electromotor E and the shaft 68 a bracket 71 is disposed, which carries a pin 29. On this pin 29 a ratchet wheel 28 is mounted to turn, which by its nave is rigidly connected with a star wheel 30. Another lever 25 is mounted to rock on a pin 72 fastened in two supports 73 and 74 and is pressed upward by a helical spring 24 surrounding the pin 72 in a similar manner as the lever 22. A stop 26 on the bracket 71 serves for limiting the upward turn of the lever 25, which latter at its free end carries a pawl 27 that engages the ratchet wheel 28. Another stop 79 on the bracket 71 serves for limiting the downward turn of the lever 25.

Close by the star wheel 30 is disposed a cut-out C consisting of two contact springs 31 and 32. The contact spring 32 carries a rounded-off or semicircular tooth 33 which is adapted to engage in the spaces of the star wheel 30. The pitch of the teeth of the star wheel is double that of the ratchet wheel, so that when the tooth 33 on the contact spring 32 engages in the respective space of the star wheel the free end of the contact spring 32 will be detached from that of the other contact spring 31, so that the cut-out C is opened, but when the ratchet wheel 28 is fed one tooth forward, the next tooth of the star wheel 30 will push off the contact spring 32 by its tooth 33 and thus press its free end against that of the other contact spring 31 for closing the contact C, which is inserted in a corresponding operating circuit 77, 78. This circuit includes one or more electric devices, machines, apparatus, or the like of any known kind which it is desired to set to work and to stop. A regulating screw 75 in a projection of the bracket 71 serves for adjusting the contact spring 31 so as to insure its proper contact with the spring 32. The lever 25 carries a bent leaf spring 34, which the lever 22 can eventually strike and depress.

Each electromotor E is shown to be provided with two binding posts 16 and 18 (Fig. 6), of which one 16 is connected by the corresponding line 15 with one contact spring 3 of the distributer D and the other binding post 18 is connected by a line 76 with a main return 19 that in turn is connected with the other pole of the source of current 4.

It will be seen, that for the position of the crank 5 of the distributer D shown at Fig. 1, in which it is in contact with one contact spring 3, the electromotor $E'$ will be inserted in the circuit of the source of current 4.

The receiving electric system described operates as follows: When it is desired at the sending station in selecting the electromotor $E^3$ to set it to work, the respective key is operated for sending electrical waves through the space to the aerial conductor 42 or its equivalent of the receiving electric system. Each time when an impulse circulates through the receiving circuit 38, 43, R, 44, 37, the relay R will be momentarily energized for attracting its armature 36 and thereby momentarily closing the primary circuit 13, 35, 45, so that the relay $R'$ is momentarily energized and at the same time the tapping device 40 is operated for returning the coherer 38 to its initial state. The energized relay $R'$ will in attracting its armature 12 turn the two-armed lever 9, 8, which on being released feeds by its pawl 10 the ratchet wheel 7 one tooth forward. As many consecutive electrical waves must b sent from the sending station and as many consecutive impulses must circulate in the receiving circuit 43, R, 44, 37, as it is desired to feed the ratchet wheel 7 so many teeth forward. The ratchet wheel 7 is shown to have 24 teeth, so that the key at the sending station requires to be depressed 24 times for causing the crank 5 to make one complete revolution. When the crank 5 strikes the first contact spring 3 (as shown at Fig. 1) the first electromotor E' will be thereby caused to turn and to wind the rope 20 on its pulley 41, whereby the lever 22 of the intermediate gear I will be gradually turned downward, so that it will approach the bent spring 34 (Fig. 5). If, however, impulses continue to consecutively circulate in the receiving circuit 38, 43, R, 44, 37 and consequently also in the primary circuit 13, R', 35, 45, the crank 5 will soon leave the first contact spring 3 before the lever 22 has come in contact with the bent spring 34, so that the electromotor E' will become without current, when the spring-pressed lever 22 will return by the rope 20 the armature shaft 67 to its initial position. Then the crank 5 will afterward strike the second spring 3 and thereby close the circuit 15, 76, 19, 4 of the second electromotor E², which will start but soon stop, as the crank 5 again leaves the second contact spring 3. Only when the crank 5 strikes the third contact spring 3 and stops (no more electrical waves being sent over from the sending station), the third electromotor E³ will run for a sufficiently long time to enable its lever 22 to strike and depress the bent spring 34 and thereby also the lever 25, so that its pawl 27 feeds the ratchet wheel 28 one tooth forward and the star wheel 30 pushes off the contact spring 32, so as to close by the cut-out C the corresponding operating circuit 77, 78 for setting the therein included devices, machines, apparatus, or the like to work. The lever 25 being checked by the lower stop 79, the electromotor will by the rope 20 draw out the helical spring 21 and so produce such a strong tension, that the armature 64 is prevented from further running and is forcibly stopped. At the sending station the operator will know from his experience or feeling the moment, at which he must again depress his key repeatedly for causing the crank 5 to leave the third contact spring 3 or to return to its initial position, in which it engages in the space between two contact springs 3, 3. When the operator wants to again stop the device, machine, apparatus, or the like he had started, of course he will have to depress his key so many times as to cause the crank 5 to strike and depress the third contact spring 3 for a sufficiently long time to enable the third electromotor E³ to actuate its intermediate gear I for feeding the ratchet wheel 28 one tooth forward and thus opening by the cut-out C the operating circuit 77, 78.

From the above explanations it will be obvious in what manner any of the electromotors E', E², E³, ... can be selected and set to work for closing or opening by its intermediate gear I and cut-out C the corresponding operating circuit 77, 78 and that several of these electromotors can be set to work one after the other and in any determined order for producing the desired effects.

The receiving electric system can be varied in many respects without departing from the spirit of our invention. When a single conductor line is to connect the sending station with the receiving station, of course, the coherer 38 with its tapping device 40 is dispensed with, while the source of current 44 may be employed or omitted (in case one is at the sending station) and the line 37 may be connected with a ground-plate.

It will have to depend upon the circumstances, whether the several operating circuits 77, 78 are to receive each a separate source of current or all of them a common source of current, or whether they are to be supplied with current from the source of current 4 in any known manner. It is obvious, that the operating circuits 77, 78 can be connected with ordinary or submarine mines.

We claim:

1. In a receiving electric system of the kind described, the combination with a receiving circuit, of a distributer controlled by said receiving circuit, electromotors, circuits controlled by said distributer and including said electromotors, cut-outs, operating circuits including said cut-outs, and intermediate gears connected with said electromotors and adapted to actuate said cut-outs only when said electromotors are permitted to run for a sufficiently long time, whereby said operating circuits are closed or opened.

2. In a receiving electric system of the kind described, the combination with a receiving circuit comprising a relay, of a distributer comprising a plurality of insulated contact springs along its periphery, a revoluble insulated shaft with a ratchet wheel and a contact crank adapted to strike the contact springs one after the other, means operated by the relay of said receiving circuit for intermittently feeding the ratchet wheel of said distributer, electromotors, circuits connecting said electromotors with the contact springs and the ratchet wheel of said distributer, cut-outs, operating circuits including said cut-outs, and intermediate gears connected with said electromotors and adapted to actuate said cut-outs only when said electromotors are permitted to run for a sufficiently long time, whereby said operating circuits are closed or opened.

3. In a receiving electric system of the kind described, the combination with a receiving circuit, of a distributer controlled by said receiving circuit, electromotors having each on its armature shaft a pulley, circuits controlled by said distributer and including said electromotors, cut-outs, operating circuits including said cut-outs, and intermediate gears for said electromotors and said cut-outs and each comprising a frame, a ratchet wheel mounted to turn on the frame, a star wheel rigidly connected with the ratchet wheel and having half as many teeth as the latter and adapted to open and to close the cut-out, a first spring-pressed lever with pawl mounted on the frame and adapted to feed the ratchet wheel one tooth forward, a second spring-pressed lever mounted on the frame and adapted to strike and turn the first spring-pressed lever only after turning through an angle, and a drawing means connecting the free end of the second spring-pressed lever with the pulley of the electromotor.

4. In a receiving electric system of the kind described, the combination with a receiving circuit comprising a relay, of a distributer comprising a plurality of insulated contact springs along its periphery, a revoluble insulated shaft with a ratchet wheel and a contact crank adapted to strike the contact springs one after the other, means operated by the relay of said receiving circuit for intermittently feeding the ratchet wheel of said distributer, electromotors having each on its armature shaft a pulley, circuits connecting said electromotors with the contact springs and the ratchet wheel of said distributer, cut-outs, operating circuits including said cut-outs, and intermediate gears for said electromotors and said cut-outs and each comprising a frame, a ratchet wheel mounted to turn on the frame, a star wheel rigidly connected with the ratchet wheel and having half as many teeth as the latter and adapted to open and to close the cut-out, a first spring-pressed lever with pawl mounted on the frame and adapted to feed the ratchet wheel one tooth forward, a second spring-pressed lever mounted on the frame and adapted to strike and turn the first spring-pressed lever only after turning through an angle, and a drawing means connecting the free end of the second spring-pressed lever with the pulley of the electromotor.

5. In a wireless operating system of the class described, the combination with a receiving conductor, of a receiving circuit connected therewith and comprising a coherer and a relay, a primary circuit controlled by the relay of said receiving circuit and comprising a relay, a tapping device for the coherer of said receiving circuit shunted to said primary circuit, a distributer controlled by the relay of said primary circuit, electromotors, secondary circuits controlled by said distributer and including said electromotors, cut-outs, operating circuits including said cut-outs, and intermediate gears connected with said electromotors and adapted to actuate said cut-outs only when said electromotors are permitted to run for a sufficiently long time, whereby said operating circuits are closed or opened.

6. In a wireless operating system of the class described, the combination with a receiving conductor, of a receiving circuit connected therewith and comprising a coherer and a relay, a primary circuit controlled by the relay of said receiving circuit and comprising a relay, a tapping device for the coherer of said receiving circuit shunted to said primary circuit, a distributer comprising a plurality of insulated contact springs along its periphery, a revoluble insulated shaft with a ratchet wheel and a contact crank adapted to strike the contact springs one after the other, means operated by the relay of said primary circuit for intermittently feeding the ratchet wheel of said distributer, electromotors, secondary circuits connecting said electromotors with the contact springs and the ratchet wheel of said distributer, cut-outs, operating circuits including said cut-outs, and intermediate gears connected with said electromotors and adapted to actuate said cut-outs only when said electromotors are permitted to run for a sufficiently long time, whereby said operating circuits are closed or opened.

7. In a wireless operating system of the class described, the combination with a receiving conductor, of a receiving circuit connected therewith and comprising a coherer and a relay, a primary circuit controlled by the relay of said receiving circuit and comprising a relay, a tapping device for the coherer of said receiving circuit shunted to said primary circuit, a distributer controlled by the relay of said primary circuit, electromotors having each on its armature shaft a pulley, secondary circuits controlled by said distributer and including said electromotors, cut-outs, operating circuits including said cut-outs, and intermediate gears for said electromotors and said cut-outs and each comprising a frame, a ratchet wheel mounted to turn on the frame, a star wheel rigidly connected with the ratchet wheel and having half as many teeth as the latter and adapted to open and to close the cut-out, a first spring-pressed lever with pawl mounted on the frame and adapted to feed the ratchet wheel one tooth forward, a second spring-pressed lever mounted on the frame and adapted to strike and turn the first spring-pressed lever only after turning through an angle, and a drawing means connecting the free end of the second spring-pressed lever with the pulley of the electromotor.

8. In a wireless operating system of the class described, the combination with a receiving conductor, of a receiving circuit connected therewith and comprising a coherer and a relay, a primary circuit controlled by the relay of said receiving circuit and comprising a relay, a tapping device for the coherer of said receiving circuit shunted to said primary circuit, a distributer comprising a plurality of insulated contact springs along its periphery, a revoluble insulated shaft with a ratchet wheel and a contact crank adapted to strike the contact springs one after the other, means operated by the relay of said primary circuit for intermittently feeding the ratchet wheel of said distributer, electromotors having each on its armature shaft a pulley, secondary circuits connecting said electromotors with the contact springs and the ratchet wheel of said distributer, cut-outs, operating circuits including said cut-outs, and intermediate gears for said electromotors and said cut-outs and each comprising a frame, a ratchet wheel mounted to turn on the frame, a star wheel rigidly connected with the ratchet wheel and having half as many teeth as the latter and adapted to open and to close the cut-out, a first spring-pressed lever with pawl mounted on the frame and adapted to feed the ratchet wheel one tooth forward, a second spring-pressed lever mounted on the frame and adapted to strike and turn the first spring-pressed lever only after turning through an angle, and a driving means connecting the free end of the second spring-pressed lever with the pulley of the electromotor.

CHRISTOPH WIRTH.
CHRISTOF BECK.

Witnesses:
WILHELM FACHER,
ANTON HAIDER.